(12) United States Patent
Fukushi et al.

(10) Patent No.: US 11,073,715 B2
(45) Date of Patent: Jul. 27, 2021

(54) METHOD FOR PRODUCING GLASS ARTICLE, AND GLASS ARTICLE

(71) Applicant: AGC Inc., Chiyoda-ku (JP)

(72) Inventors: Takanori Fukushi, Tokyo (JP); Satoshi Kanasugi, Tokyo (JP); Makoto Fujii, Tokyo (JP); Toru Ikeda, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 118 days.

(21) Appl. No.: 15/714,239

(22) Filed: Sep. 25, 2017

(65) Prior Publication Data
US 2018/0088399 A1 Mar. 29, 2018

(30) Foreign Application Priority Data

Sep. 27, 2016 (JP) .............................. JP2016-188758
Sep. 1, 2017 (JP) .............................. JP2017-168596

(51) Int. Cl.
*G02F 1/1335* (2006.01)
*G02B 5/02* (2006.01)
(Continued)

(52) U.S. Cl.
CPC ...... *G02F 1/133502* (2013.01); *C03B 23/025* (2013.01); *C03B 23/0258* (2013.01);
(Continued)

(58) Field of Classification Search
CPC ... G02F 1/133502; G02F 2001/133331; C03B 40/00; C03B 25/025; C03B 23/0357;
(Continued)

(56) References Cited

U.S. PATENT DOCUMENTS

2011/0062849 A1 3/2011 Carlson et al.
2013/0244359 A1* 9/2013 Bamber .............. H01L 31/0392
438/29
(Continued)

FOREIGN PATENT DOCUMENTS

JP 2016-29474 A 3/2016
WO WO 2009/025289 A1 2/2009
(Continued)

OTHER PUBLICATIONS

Hayashi et al., Dragontrail™: Novel Damage-Resistant Glass for Chemical Strengthening, Res. Report Asahi Glass Cp., Ltd., pp. 11-17, 61(2011).

*Primary Examiner* — Anthony J Frost
(74) *Attorney, Agent, or Firm* — Oblon, McClelland, Maier & Neustadt, L.L.P.

(57) ABSTRACT

A method for producing a glass article from a glass member including a glass substrate including a first main surface, a second main surface and an end face, and an irregular layer formed in at least one of main surfaces, includes forming an irregular layer having a glass transition point Tg which is equal to or lower than a glass transition point in a central part of the glass member in a thickness-direction sectional view and performing a heat treatment on the glass member so as to have an equilibrium viscosity in the central part of the glass member in thickness-direction sectional view of $10^{17}$ Pa·s or lower.

17 Claims, 11 Drawing Sheets

(51) Int. Cl.
*G02B 1/115* (2015.01)
*C03B 23/025* (2006.01)
*C03C 17/00* (2006.01)
*C03C 21/00* (2006.01)
*C03C 17/25* (2006.01)
*C03B 25/02* (2006.01)
*C03C 3/085* (2006.01)
*C03B 40/00* (2006.01)
*C03B 23/035* (2006.01)
*C03C 3/087* (2006.01)
*C03C 15/00* (2006.01)
*C03B 23/03* (2006.01)
*C03B 29/02* (2006.01)
*G02F 1/1333* (2006.01)

(52) U.S. Cl.
CPC ...... *C03B 23/0307* (2013.01); *C03B 23/0357* (2013.01); *C03B 25/025* (2013.01); *C03B 40/00* (2013.01); *C03C 3/085* (2013.01); *C03C 3/087* (2013.01); *C03C 15/00* (2013.01); *C03C 17/007* (2013.01); *C03C 17/25* (2013.01); *C03C 21/002* (2013.01); *G02B 1/115* (2013.01); *G02B 5/0221* (2013.01); *C03B 29/025* (2013.01); *C03C 2217/213* (2013.01); *C03C 2217/445* (2013.01); *C03C 2218/34* (2013.01); *G02F 1/133331* (2021.01); *Y02P 40/57* (2015.11)

(58) Field of Classification Search
CPC ............ C03B 23/0307; C03B 23/0258; C03B 23/025; C03B 29/025; C03C 15/00; C03C 3/087; C03C 3/085; C03C 17/25; C03C 21/002; C03C 17/007; C03C 2218/34; C03C 2217/213; C03C 2217/445; G02B 5/0221; G02B 1/115; Y02P 40/57
See application file for complete search history.

(56) References Cited

U.S. PATENT DOCUMENTS

| 2014/0246084 | A1* | 9/2014 | Okahata | C03C 15/00 136/256 |
| 2015/0198752 | A1* | 7/2015 | Lander | C03C 15/00 359/601 |
| 2016/0318794 | A1 | 11/2016 | Tanaka et al. | |

FOREIGN PATENT DOCUMENTS

| WO | WO 2015/093029 A1 | 6/2015 |
| WO | WO 2015/133346 A1 | 9/2015 |

* cited by examiner

METHOD FOR PRODUCING GLASS ARTICLE, AND GLASS ARTICLE

CROSS-REFERENCE TO RELATED APPLICATIONS

This application claims priority from Japanese Patent Application No 2016-188758 filed on Sep. 27, 2016, and Japanese Patent Application No. 2017-168596 filed on Sep. 1, 2017, the entire subject matter of which is incorporated herein by reference.

BACKGROUND OF THE INVENTION

Technical Field

The present invention relates to a method for producing a glass article, and a glass article.

Background Art

In the background art, a glass plate (hereinafter referred to as front surface plate) with an antiglare film or an antireflection film is used in a touch sensor, a liquid crystal panel, etc. (see Patent Literature 1 or 2). Improvement in visibility by the antiglare film or the antireflection film and increase in strength by use of the glass plate can be made compatible in the front surface plate. For this reason, the front surface plate is expected to be applied to an on-vehicle display panel.

CITATION LIST

Patent Literature

Patent Literature 1: WO 2009/025289
Patent Literature 1: WO 2015/133346

BRIEF SUMMARY OF THE INVENTION

Problem that the Invention is to Solve

When the front surface plate is applied to the on-vehicle display panel, a touch sensor disposed on the back surface of the front surface plate is operated through the front surface plate by a user. On this occasion, the user uses his/her own finger or a stylus to touch the front surface plate. In an initial stage of use of the front surface plate, the front surface plate has high visibility due to the antiglare film, the antireflection film, etc. However, it is considered that a long time use of the front surface plate may cause a problem about wear resistance that the antiglare film or the like is separated to reduce the visibility.

An object of the present invention is to provide a glass article superior in visibility such as antiglare property and high in wear resistance, and a method for producing the glass article.

The present invention relates to the followings.
(1) A method for producing a glass article from a glass member including a glass substrate including a first main surface, a second main surface and an end face, and an irregular layer formed in at least one of the main surfaces, the method including forming the irregular layer having a glass transition point Tg which is equal to or lower than a glass transition point in a central part of the glass member in a thickness-direction sectional view, and performing a heat treatment on the glass member so as to have an equilibrium viscosity in the central part of the glass member in the thickness-direction sectional view of $10^{17}$ Pa·s or lower.
(2) The method for producing a glass article according to (1), wherein the irregular layer is formed by etching treatment.
(3) The method for producing a glass article according to (1), wherein the irregular layer is formed by blasting treatment.
(4) The method for producing a glass article according to any one of (1) to (3), wherein the heat treatment is performed in a molding step.
(5) The method for producing a glass article according to (4), wherein in the molding step, the glass member is mounted on a mold so that one of the main surfaces or the end surface of the glass member can be in contact with the mold, and then the glass member is deformed.
(6) The method for producing a glass article according to (5), wherein in the molding step, temperature control is performed on a surface of the glass member that is not in contact with the mold.
(7) The method for producing a glass article according to (6), wherein the surface of the glass member that is not in contact with the mold includes the irregular layer.
(8) The method for producing a glass article according to any one of (1) to (3), wherein the heat treatment is performed in an annealing step.
(9) The method for producing a glass article according to any one of (1) to (8), wherein the heat treatment is performed by radiation heating.
(10) The method for producing a glass article according to any one of (1) to (9), wherein the heat treatment is performed by convection heating.
(11) A glass article including a first main surface, a second main surface and an end face, wherein an antiglare layer is provided in at least one of the main surfaces, a glass transition point Tg of the antiglare layer is equal to or lower than a glass transition point $Tg_0$ in a central part of the glass article in a thickness-direction sectional view, a standard deviation of a haze value within a surface of the glass article is from 0 to 10%, and at least one of the main surfaces includes a curvature part.
(12) A glass article including a first main surface, a second main surface and an end face, wherein an antiglare layer is provided in at least one of the main surfaces, a glass transition point Tg of the antiglare layer is equal to or lower than a glass transition point $Tg_0$ in a central part of the glass article in a thickness-direction sectional view, the antiglare layer has arithmetic mean roughness Sa within a surface of 0.06 µm or less and surface skewness Ssk of less than 0 in a surface shape obtained by measuring a region of (101 µm×135 µm) to (111 µm×148 µm) in the antiglare layer with a laser microscope, and the glass article includes a convex part having an average diameter (in terms of a true circle) at a height of +0.01 µm from bearing height in an image processed surface of 0.4 µm or more and 1.1 µm or less with reference to the bearing height when an image obtained from XYZ data of the surface shape measured with the laser microscope is filtered by image processing software SPIP (made by Image Metrology A/S) to obtain a smoothed image, and XYZ data of the smoothed image are subtracted from XYZ data of the surface shape to obtain the image processed surface.
(13) The glass article according to (12), wherein at least one of the main surfaces includes a curvature part.
(14) The glass article according to any one of (11) to (13), wherein a ratio $Z_1/Z_0$ of an atomic composition ratio $Z_1$ in the antiglare layer to an atomic composition ratio $Z_0$ in the central part of the glass article in the thickness-direction sectional view is from 0.9 to 1.1 when an atomic composition ratio Z between Si and an element X selected from the group consisting of Al, B, Zr and Ti is defined as X/Si.
(15) The glass article according to any one of (11) to (14), wherein an alkali metal composition ratio expressed by {K/(Li+Na+K)} is larger in the antiglare layer than in the central part of the glass article in the thickness-direction sectional view.
(16) The glass article according to any one of (11) to (15), wherein a fluorine atom (F) or a chlorine atom (Cl) is contained in the antiglare layer.

Advantage of the Invention

According to the invention, it is possible to provide a glass article superior in visibility such as antiglare property and high in wear resistance, and a method for producing the glass article.

BRIEF DESCRIPTION OF THE DRAWINGS

FIG. 1A shows a shape provided with a curvature part and a flat part,
and FIG. 1B shows a shape formed into a curvature part as a whole.
FIG. 4A shows a shape formed into a flat part as a whole,
and FIG. 4B shows a shape provided with a curvature part and a flat part.
FIG. 10A shows a shape consisting of only a flat part,
and FIG. 10B shows a shape provided with a curvature part and a flat part.

DETAILED DESCRIPTION OF THE INVENTION

Mode for Carrying Out the Invention

The following definitions of terms can be applied to the present description and the scope of claims.
A "flat part" means a part having an average curvature radius of more than 5,000 mm.
A "curvature part" means a part having an average curvature radius of 5,000 mm or less.

Figure 1A:
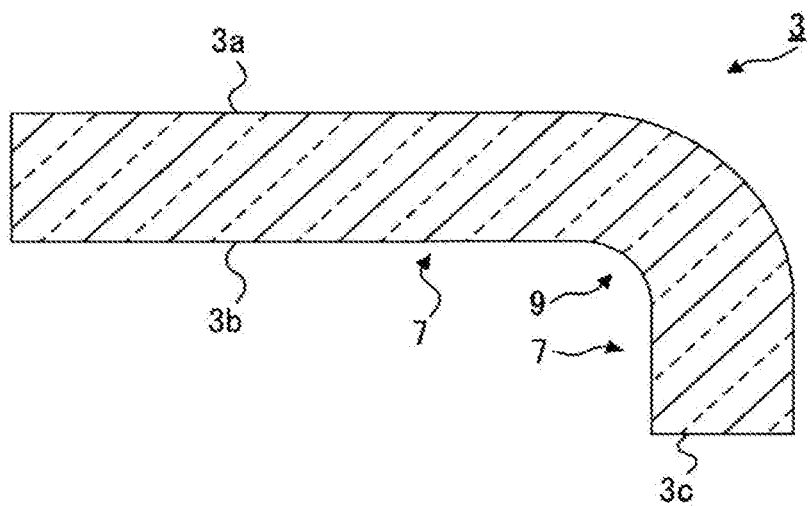
FIG. 1A and FIG. 1B are sectional schematic views of curvature plates (glass substrate with a curvature part).
Figure 1B:
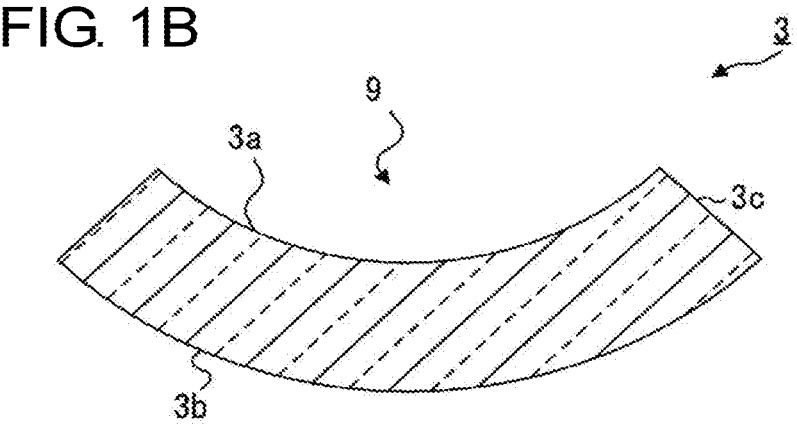
Figure 2A:
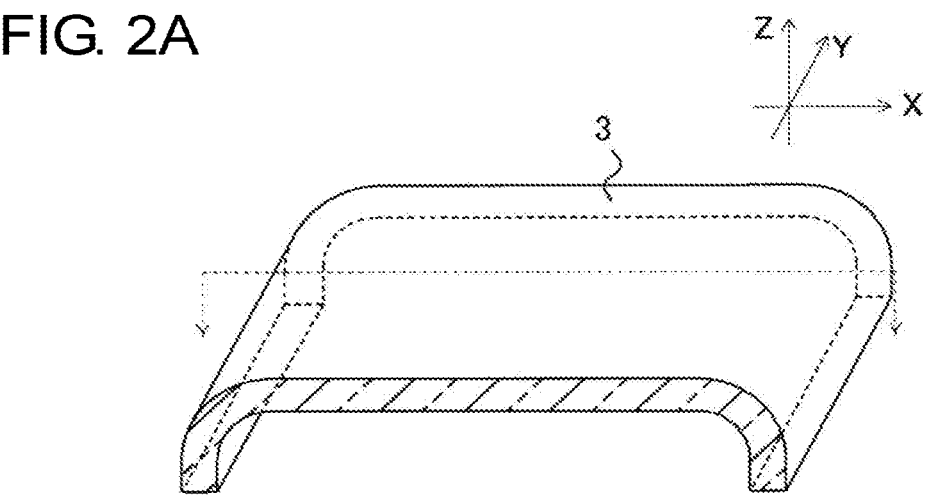
FIG. 2A and FIG. 2B are views for explaining bending depth of the curvature plate.
Figure 2B:
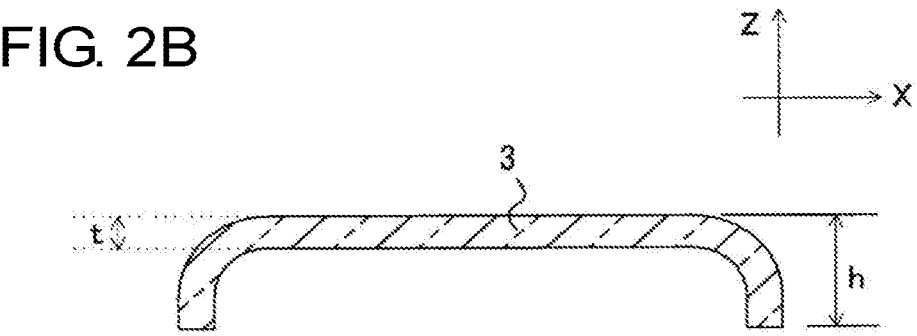

A "curvature plate (a glass substrate 3 including a curvature part 9)" means a shape including a first main surface 3a, a second main surface 3b and end faces 3c and provided with at least one curvature part 9 as shown in each of the schematic sectional views of FIG. 1A and FIG. 1B. Examples of the shape may include a shape in which a curvature part 9 and a flat part 7 have been combined as shown in FIG. 1A, and a shape which has been formed into a curvature part 9 as a whole as shown in FIG. 1B. However, the shape is not limited especially as long as it includes a curvature part 9.
"Bending depth" means a distance between a straight line connecting two end parts in one of main surfaces in a thickness-direction sectional view of a glass substrate provided with a curvature part, and, of straight lines parallel to the aforementioned straight line, a tangential line in contact with the curvature part. In the curvature plate as shown in FIG. 2A and FIG. 2B, the bending depth corresponds to a distance h between opposite ends of the curvature plate in a bending direction (a. Z-direction in FIG. 2A or FIG. 2B). In FIG. 2A, a flat surface is defined as X-Y plane. In FIG. 1B, a plane perpendicular to the bending direction (Z-direction) is defined as X-Y plane.
"Line arithmetic mean roughness Ra" is measured according to JIS B0601:2001 (ISO 4287:1997).
"Equilibrium viscosity" means viscosity in a composition at a central part of the glass plate in the thickness-direction sectional view. The equilibrium viscosity is measured by a beam bending method (ISO 7884-4: 1987), a fiber elongation method (ISO 7884-3: 1987), a parallel-plate viscometer (ASTMC 338-93: 2003), or a sinking bar viscometer (ISO 7884-5: 1987), depending on the viscosity range to be measured. In the embodiment, the equilibrium viscosity is measured by the beam bending method (ISO 7884-4: 1987).
A "haze value" is measured by use of a haze meter (HR-100 model, made by Murakami Color Research Laboratory Co., Ltd.) according to JIS K 7136:2000.
"Bearing height" means a value of most dominant height Z in a height distribution histogram obtained from XYZ data of a surface shape of a region (hereinafter also referred to as "region to be observed") (measuring 101 μm×135 μm) to (measuring 111 μm×148 μm). The XYZ data are obtained by measuring the region to be observed with a laser microscope (VK-X100, made by Keyence Corporation), and analyzing measurement data with image processing software (trade name: SPIP, made by Image Metrology A/S). The height Z in the XYZ data is a height based on a lowest point of the region to be observed (length of a perpendicular line dropped from a position where the height Z is measured to a plane which is parallel to a main surface of a material to be measured in the region to be observed and which includes the lowest point). In the following description, the same thing can be also applied to height in any surface shape as long as a specific reference is not defined. An interval (bin) of the histogram for calculating the bearing height is set at 1,000.
An "image-processed surface" means a surface obtained as follows. That is, an image obtained from XYZ data of a surface shape obtained in measurement with a laser microscope as described above is filtered by image processing software (trade name: SPIP, made by Image Metrology A/S) to thereby acquire a smoothed image. XYZ data of the smoothed image is subtracted from the XYZ data of the surface shape to thereby obtain the image-processed surface. Incidentally, when a substrate as a material to be measured includes a curvature part, the periphery of the substrate is pressed and flattened by a jig, and the substrate in this state is observed and measured with the laser microscope to obtain the aforementioned XYZ data of the surface shape.

Operation for obtaining the aforementioned "image-processed surface" can be performed in the following steps (i) to (iv).

(i) A tilt of XYZ data actually measured from a surface shape of an antiglare layer is corrected in a custom mode, so as to obtain a surface shape image corrected with bearing height set as 0.

(ii) The surface shape image corrected with the bearing height set as 0 is filtered on conditions of "convolution: smoothing: set as average" and "kernel size: X=Y=31, set as circle" so as to average Z as a unit of a circle of 31 pieces of the XYZ data. Thus, a smooth concave-convex surface shape image (hereinafter also referred to as "smoothed image") is obtained.

(iii) "Particles" are detected with a threshold level of 0.01 µm from the surface shape image corrected with the bearing height as 0. After that, "filter difference" is selected in a measurement item of an image window, "saving holes in the shape" is selected, post-processing for "smoothing the shape contour" is performed with the filter size of 51 point to obtain a post-processed surface shape image (hereinafter also referred to as "surface shape").

(iv) An "image-processed surface" is obtained as a difference between the smoothed image and the surface shape.

The "custom mode" in the step (i) is a mode to be displayed when tilt correction (flattening) is performed by the SPIP. Specifically, the following four operations are automatically performed.

(i-1) An "average profile fit method" is selected as a "whole surface correcting method", and a degree of 3 is set.

(i-2) "Processing step" is not selected.

(i-3) "None" is selected as "correction for each line"

(i-4) "Setting bearing height as zero" is selected as "Z-offset method".

When the tilt correction is performed, a fit surface to the XYZ data of the surface shape obtained by the laser microscope is calculated from the average profiles of X and Y, and subtracted from the image. Thus, the tile of the image as a whole, and unnecessary curves are removed.

When the kernel size is set as X=Y=31 and a circle is set in the step (ii), a frame (kernel) which is an octagon inscribed in a 31×31 square and serving as a replacement of a circle is set. In the filtering, original data are replaced by a simple average value of all the points within the kernel independently of the shape of the kernel. In addition, due to the filtering, a smoothed image from which fine irregularities have been eliminated (averaged) is obtained.

An averaging filter of the SPIP is expressed by the following matrix operation when it is a 31×31 filter.

As for one point, 961 points are extracted from the XYZ data circularly (in order from a point closest to the point) around the one point. Z-values for the respective points XY are totaled, and the total value is divided by 961. A value obtained thus is set as a Z-value in the coordinates XY. Such calculation is performed on all the points. Intervals between measuring points in the X-direction and in the Y-direction are 71 nm respectively. On this occasion, since the averages are obtained for all the points while the center point is shifted one point by one point to an adjacent point, there is no fear that resolution deteriorates.

$$C = \frac{1}{961} \begin{bmatrix} 1 & 1 & \cdots & 1 \\ \vdots & \vdots & & \vdots \\ 1 & 1 & \cdots & 1 \\ 1 & 1 & \cdots & 1 \end{bmatrix} \text{ Y-direction: 31 points}$$

X-direction: 31 points

[Expression 1]

The threshold level of 0.01 µm in the step (iii) means that particles (convex parts) having a height of 0.01 µm or more are detected. The height is based on the bearing height.

In the post-processing, "saving holes in the shape" means an operation in which, when there is a concave part having a height of 0.01 µm or less in a region where a particle has been detected, the area of the concave part is not counted as the area of the particle.

"Smoothing the shape contour" means an operation for removing noise from the shape contour of the particles.

The filter size designates a degree with which the shape contour of the particles is smoothed. As the filter size is increased, the smoothed shape contour is closer to a circle.

That is, in a surface shape obtained by the post-processing in the step (iii), noise has been removed from the actual measurement data, and the shape contour of the convex parts has been adjusted. The obtained surface shape can be regarded as a concave-convex surface shape including actual first convex parts.

In the step (iv), the surface shape obtained in the step (iii) is subtracted from the smoothed image obtained in the step (ii). Thus, an "image-processed surface" is obtained.

Generally, when convex parts are distributed on a wavy surface, it is difficult to measure the number or shapes of the convex parts correctly. In the aforementioned shape analysis, when the smoothed image and the surface shape are laid on each other, convex parts located above the surface of the smoothed image are determined as convex parts distributed on the surface where waviness has been eliminated from the wavy surface.

"Surface skewness (Ssk)" is a value obtained from the aforementioned laser microscope measurement data analyzed by image processing software (trade name: SPIP, made by Image Metrology A/S), and expressing symmetry in height distribution. A surface having Ssk of less than 0 means a surface having a large number of small valleys. A calculation method conforms to ISO 25178: 2010.

"Surface arithmetical mean roughness (Sa)" is obtained by the aforementioned laser microscope measurement data analyzed by image processing software (trade name: SPIP, made by Image Metrology A/S), in the same manner. The surface arithmetical mean roughness (Sa) is a parameter in which Ra (line arithmetical mean roughness) has been expanded to a surface so that a mean of absolute values of height differences of respective points from an average plane of the surface. A calculation method conforms to ISO 25178: 2010.

A "reflected image diffusive index value R" is calculated by the following method. First, a material to be measured is irradiated with light from a direction of +45° based on a surface of the material to be measured (regarded as 0°), and luminance of regular reflected light reflected on the surface of the material to be measured (referred to as 45° regular reflected light) is measured. Next, in the same manner, the material to be measured is irradiated with light from the direction of +45°, and luminance of total reflected light reflected on the surface of the material to be measured is measured with a light receiving angle varying within a range of from 0° to +90°. These measured values are substituted into an equation of "reflected image diffusive index value R=(luminance of total reflected light−luminance of 45° regular reflected light)/(luminance of total reflected light)". Thus, the reflected image diffusive index value R is obtained.

A "resolution index value T" is calculated by the following method. A material to be measured including a first main surface and a second main surface is irradiated from the second main surface side with first light in a parallel direction (referred to as direction of angle 0°) to a thickness direction of the material to be measured, and luminance of transmitted light (referred to as 0° transmitted light) transmitted from the first main surface is measured. Next, luminance of total transmitted light of the first light transmitted from the first main surface side is measured with a light receiving angle to the first main surface varying within a range of from −90° to +90°. These measured values are substituted into an equation of "resolution index value T=(luminance of total transmitted light−luminance of 0° transmitted light)/(luminance of total transmitted light)". Thus, the resolution index value T is obtained.

A "sparkle index value S" is obtained as follows. Of a material to be measured including a first main surface and a second main surface, the second main surface is disposed on the display surface side of an iPhone 4 (registered trademark) (pixel density 326 ppi) made by Apple Incorporated. Next, an image is acquired by photographing from the first main surface side of the material to be measured. The image is analyzed by software (trade name: EyeScale-4W, made by i-System Co., Ltd.). A value of ISC-A outputted by the analysis is regarded as the sparkle index value S.

"60° mirror surface glossiness (gloss value)" is measured by use of a gloss meter (MULTI GLOSS 268Plus, made by Konica Minolta, Inc.) without canceling reflection on the back (an opposite surface to the side where an irregular structure has been formed) according to a method stipulated in JIS Z8741:1997 (ISO 2813:1994).

An embodiment of the invention will be described below in detail with reference to the drawings.

In a method for producing a glass article according to the embodiment, a glass member as a body to be heated is subjected to a heat treatment, for example, to a temperature of 600° C. or higher so as to have an equilibrium viscosity of about $10^{6.5}$ to $10^{12.5}$ Pa·s. Specifically, the heat treatment is performed by a molding step or an annealing step. By the heat treatment, a surface shape of the glass member can be formed into a desired shape, and a glass article obtained thus shows desired durability and desired optical characteristic.

In the following description, the body to be heated which has not been subjected to a heat treatment yet will be referred to as glass member, and a glass member which has been subjected to a heat treatment will be referred to as glass article.

Figure 3:
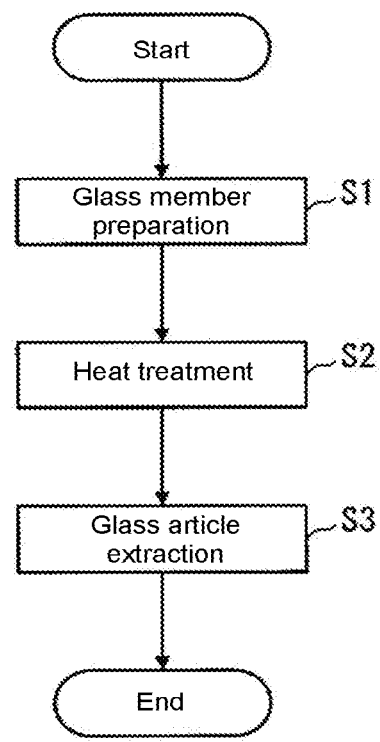
FIG. 3 is a flow chart of a schematic procedure showing an example of a production process for producing a glass article by heat treatment (S2).

FIG. 3 is a flow chart of a schematic procedure showing an example of a process for producing a glass article by a heat treatment.

In the production process of a glass article, a glass member is prepared (glass member preparation; S1). After the glass member preparation (S1), a heat treatment such as a molding step or an annealing step is performed on the glass member (heat treatment; S2), and a glass article is finally extracted (glass article extraction; S3).

<Glass Member Preparation; S1>

Figure 4A:
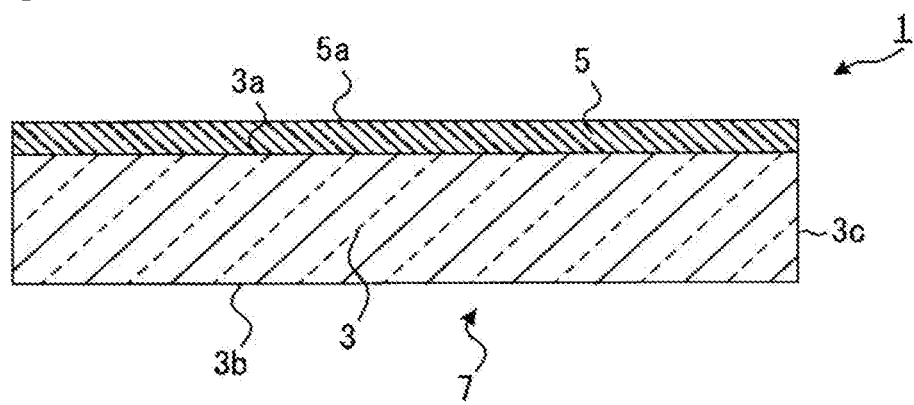
FIG. 4A and FIG. 4B are sectional schematic views of glass members including an irregular layer in each first main surface.
Figure 4B:
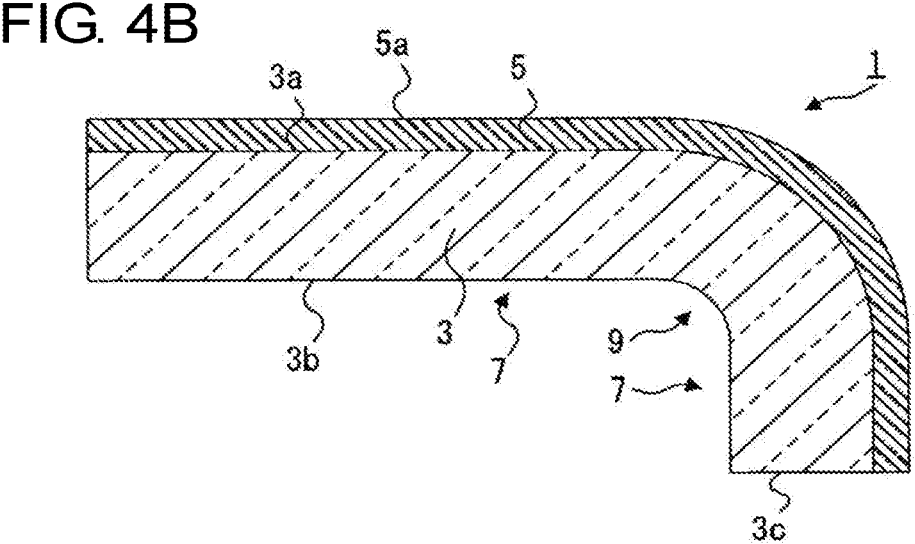

As shown in FIG. 4A or FIG. 4B, a glass member 1 has a glass substrate 3 including a first main surface 3a, a second main surface 3b and end faces 3c, and an irregular layer 5 formed in at least one of the main surfaces. The shape of the glass member is not limited especially. The glass member may have either a shape with even thickness like a plate or a shape with uneven thickness.

(Glass Base Material 3)

As the glass substrate 3, for example, alkali-free glass, soda lime glass, soda lime silicate glass, aluminosilicate glass, boron silicate glass, lithium aluminosilicate glass, and borosilicate glass can be used. Among these, aluminosilicate glass is preferred since large stress can be applied easily to the glass by strengthening treatment which will be described later in spite of its small thickness to obtain a glass having high strength in spite of its small thickness, and the obtained glass is suitable for an article to be disposed on the visual recognition side of an image display apparatus.

[Glass Composition]

Specific examples of the glass composition may include a glass containing, as a composition represented by mol % based on oxides, from 50 to 80% of $SiO_2$, from 0.1 to 25% of $Al_2O_3$, from 3 to 30% of $Li_2O+Na_2O+K_2O$, from 0% to 25% of $MgO$, from 0 to 25% of $CaO$, and from 0 to 5% of $ZrO_2$, but the glass composition is not limited especially. More specifically, examples of the glass composition may include the following glass compositions. Here, for example, the phrase "containing from 0 to 25% of MgO" means that MgO is not essential but may be contained up to 25%. The glass (i) is encompassed by soda lime silicate glass, and the glasses (ii) and (iii) are encompassed by aluminosilicate glass.

(i) A glass containing, as a composition represented by mol % based on oxides, from 63 to 73% of $SiO_2$, from 0.1 to 5.2% of $Al_2O_3$, from 10 to 16% of $Na_2O$, from 0 to 1.5% of $K_2O$, from 0 to 5% of $Li_2O$, from 5 to 13% of $MgO$, and from 4 to 10% of $CaO$.

(ii) Glass containing, as a composition represented by mol % based on oxides, from 50 to 74% of $SiO_2$, from 1 to 10 of $Al_2O_3$, from 6 to 14% of $Na_2O$, from 3 to 11% of $K_2O$, from 0 to 5% of $Li_2O$, from 2 to 15% of $MgO$, from 0 to 6% of $CaO$, and from 0 to 5% of $ZrO_2$, wherein a total of the contents of $SiO_2$ and $Al_2O_3$ is 75% or less, a total of the contents of $Na_2O$ and $K_2O$ is from 12 to 25%, and a total of the contents of $MgO$ and $CaO$ is from 7 to 15%

(iii) A glass containing, as a composition represented by mol % based on oxides, from 68 to 80% of $SiO_2$, from 4 to 10% of $Al_2O_3$, from 5 to 15% of $Na_2O$, from 0 to 1% of $K_2O$, from 0 to 5% of $Li_2O$, from 4 to 15% of $MgO$, and from 0 to 1% of $ZrO_2$.

(iv) A glass containing, as a composition represented by mol % based on oxides, from 67 to 75% of $SiO_2$, from 0 to 4% of $Al_2O_3$, from 7 to 15% of $Na_2O$, from 1 to 9% of $K_2O$, from 0 to 5% of $Li_2O$, from 6 to 14% of $MgO$, and from 0 to 1.5% of $ZrO_2$, wherein a total of the contents of $SiO_2$ and $Al_2O_3$ is from 71 to 75%, a total of the contents of $Na_2O$ and $K_2O$ is from 12 to 20%, and in the case of containing CaO, the content thereof is less than 1%.

In order to suitably perform chemically strengthening treatment which will be described later, it is preferable that a total of contents of $Li_2O$ and $Na_2O$ is 12 mol % or more in the glass composition. Further, since the glass transition point decreases to facilitate molding as the content of $Li_2O$ increases in the glass composition, the content of $Li_2O$ is preferably 0.5 mol % or more, more preferably 1 mol % or more, and further more preferably 2 mol % or more. Further, in order to increase a surface compressive stress (hereinafter also referred to as CS) layer and surface compressive stress layer depth (depth of layer; hereinafter also referred to as DOL), it is preferable that the glass composition contains 60 mol % or more of $SiO_2$, and 8 mol % or more of $Al_2O_3$.

When the glass substrate 3 is colored and used, a coloring agent (coloring component) may be added as long as it does not inhibit the achievement of the desired chemical-strengthening properties. Examples of the coloring agent may include $Co_3O_4$, MnO, $MnO_2$, $Fe_2O_3$, NiO, CuO, $Cu_2O$, $Cr_2O_3$, $V_2O_5$, $Bi_2O_3$, $SeO_2$, $TiO_2$, $CeO_2$, $Er_2O_3$, $Nd_2O_3$, which respectively are metal oxides of Co, Mn, Fe, Ni, Cu, Cr, V, Bi, Se, Ti, Ce, Er, and Nd, which have absorption in the visible region.

When colored glass is used as the glass substrate 3, the glass may contain, as represented by mol percentage based on oxides, 7% or less of a coloring component (at least one component selected from the group consisting of each metal oxide of Co, Mn, Fe, Ni, Cu, Cr, V, Bi, Se, Ti, Ce, Er and Nd). When the content of the coloring component exceeds 7%, the glass is likely to be devitrified easily. The content of the coloring component is preferably 5% or less, more preferably 3% or less, still more preferably 1% or less. In addition, the glass substrate 3 may appropriately contain $SO_3$, chloride, fluoride, etc. as a refining agent during melting.

[Production Method of Glass]

Description will be made about a method for producing flat-plate-like glass which can be used as the glass substrate 3. First, raw materials of components are compounded to obtain the aforementioned composition, and heated and melted in a glass melter. The glass is homogenized by bubbling, stirring, addition of a refining agent, etc., and a glass plate with predetermined thickness is produced by a well-known molding method, and cooled gradually. Examples of the molding method may include a float method, a press method, a fusion method, a down draw method and a rollout method. Among these, the float method which is suitable for mass production is preferred. A continuous production method other than the float method, that is, the fusion method or the down draw method is also preferred. The glass plate produced like a flat plate by a desired production method is gradually cooled down and then cut into a predetermined size. Thus, a flat-plate-like glass is obtained. Incidentally, for example, when more precise dimensional accuracy is required, polishing or grinding, edge processing or hole making as will be described later may be performed on the glass plate which has been cut. Thus, cracking or chipping can be reduced in handling during a heating step or the like, so that the yield can be improved. Further, the glass substrate 3 is not limited to the flat-plate-like shape, but may have a curvature part partially.

(Irregular Layer 5)

The irregular layer 5 is a layer which can scatter reflected light to obtain an effect of reducing glare of the reflected light due to reflection of a light source. The irregular layer 5 may be formed by processing at least one of the main surfaces of the glass substrate 3 itself. Alternatively, the irregular layer 5 may be formed on at least one of the main surfaces by another deposition treatment method. As a method for forming the irregular layer, for example, it is possible to use a method in which surface treatment is performed on at least a part of the glass substrate 3 by a chemical treatment or a physical treatment to thereby form an irregular shape with desired surface roughness. Alternatively, an irregular shape may be formed in at least a part of the at least one of the main surfaces of glass substrate 3 by a deposition treatment method for applying or spraying treatment liquid or a thermal treatment method of molding or the like.

Specifically, a method for performing an etching treatment (first etching treatment) may be used as the chemical treatment. In the etching treatment, the glass substrate 3 as a body to be treated is immersed and etched, for example, in a mixed solution of hydrogen fluoride and ammonium fluoride, a mixed solution of hydrogen fluoride and potassium fluoride, a mixed solution of hydrogen fluoride and hydrogen chloride, or the like.

The physical treatment is, for example, carried out by so-called a blasting treatment in which crystalline silicon dioxide power or the like is blasted against at least one of the main surfaces of the glass substrate 3 by pressurized air, or a method in which crystalline silicon dioxide powder or the like is attached to a brush, and at least one of the main surfaces of the glass substrate 3 is polished with the brush wetted with water.

Of these, the etching treatment as the chemical treatment can be favorably used because micro-cracks are hardly generated in the treated surface of the glass substrate 3 so that reduction in strength cannot occur easily.

Further, it is preferable that second etching treatment is performed for adjusting the surface shape of the irregular layer 5 of the glass substrate 3 subjected to the first etching treatment. As the second etching treatment, it is possible to use a method in which the glass substrate 3 is immersed in an etching solution which is, for example, a solution of hydrogen fluoride. The etching solution may contain acid such as hydrochloric acid, nitric acid or citric acid in addition to the hydrogen fluoride. When such an acid is contained in the etching solution, local occurrence of precipitates caused by reaction between cations such as Na ions or K ions contained in the glass and hydrogen fluoride can be suppressed, and etching can be advanced uniformly within the surface to be treated.

When the first and second etching treatments are performed, concentration in each etching solution, immersing time of the glass substrate 3 in the etching solution, etc. are controlled to control an etching amount. Thus, the irregular shape of the irregular layer 5 of the glass substrate 3 can be formed and adjusted with desired surface roughness. In addition, cracks which may occur when the irregular shape is formed by physical surface treatment such as blasting treatment can be eliminated by such an etching treatment.

In the first and second etching treatments, it is preferable that etching is performed so that inorganic fluoride or inorganic chloride can stay behind in the surface of the glass substrate 3 to thereby form particularly inorganic fluoride of multivalent cations such as Si, Al, Ca, Mg, etc.

As the deposition treatment method, it is possible to use a well-known wet coating method (such as a spray coating method, an electrostatic coating method, a spin coating method, a dip coating method, a die coating method, a curtain coating method, a screen coating method, an inkjet method, a flow coating method, a gravure coating method, a bar coating method, a flexographic coating method, a slit coating method, or a roll coating method), etc.

The glass transition point (Tg) of the irregular layer 5 is equal to or lower than the glass transition point in a central part of the glass member 1 in a thickness-direction sectional view. Cracking hardly occur in the irregular layer 5 during the heat treatment (S2) which will be described later. Thus, a glass article 10 having an excellent optical characteristic and showing wear resistance can be obtained. Particularly in a molding step (S2A) which will be described later, due to the flexibility of the irregular layer 5, the irregular layer 5 can be deformed in accordance with a load even when the load is applied during molding. Thus, unevenness in the irregular layer can be suppressed, and a glass article 10 superior in appearance can be obtained.

<Heat Treatment; S2>

Heat treatment such as a molding step (S2A) or an annealing step (S2B) is performed on the glass member 1.

(Molding Step; S2A)

Figure 5:
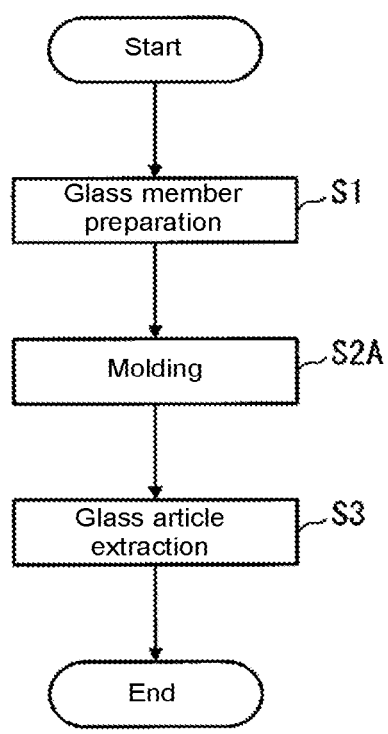
FIG. 5 is a flow chart of a schematic procedure showing an example of a production process for producing a glass article by a molding step (S2A).
Figure 6:
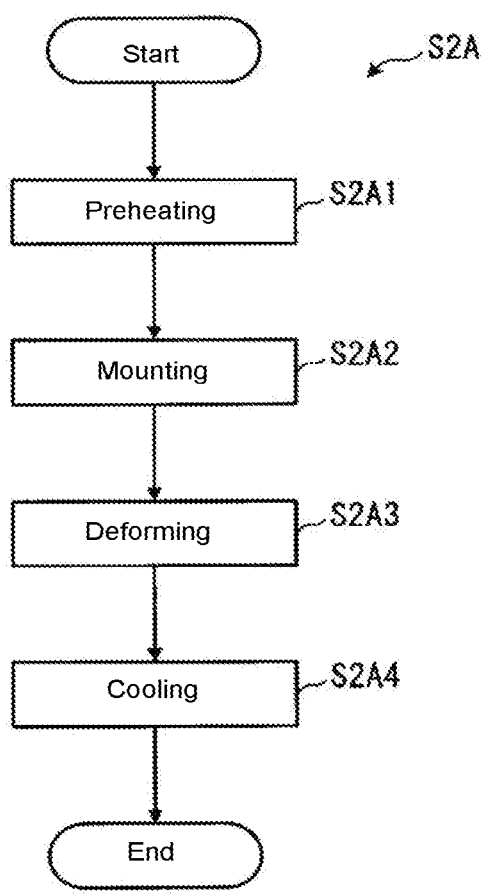
FIG. 6 is a flow chart of a schematic procedure showing an example of the molding step (S2A).

FIG. 5 is a flow chart of a schematic procedure showing an example of the production process in which the heat treatment is performed in the molding step (S2A). In the molding step (S2A), as shown in FIG. 6, preheating (S2A1), mounting the glass member on a mold or the like (S2A2), deformation for providing a desired shape in the glass member (S2A3), and cooling the glass member provided with the desired shape (S2A4) are performed. The step order is not limited especially. For example, preheating may be performed after mounting the glass member. The glass member 1 supported by a suitable support member such as a support base, a lower mold, an arm, etc. in advance may be made movable.

[Preheating; S2A1]

The glass member 1 is, for example, heated to about 500° C., which is lower than the softening point, until equilibrium viscosity thereof reaches $10^{12.5}$ Pa·s or higher and $10^{17}$ Pa·s or lower. Thus, damages such as cracks in the glass member 1 can be prevented from occurring when the glass member 1 is rapidly heated to the vicinity of the softening point.

[Mounting; S2A2]

Figure 7:
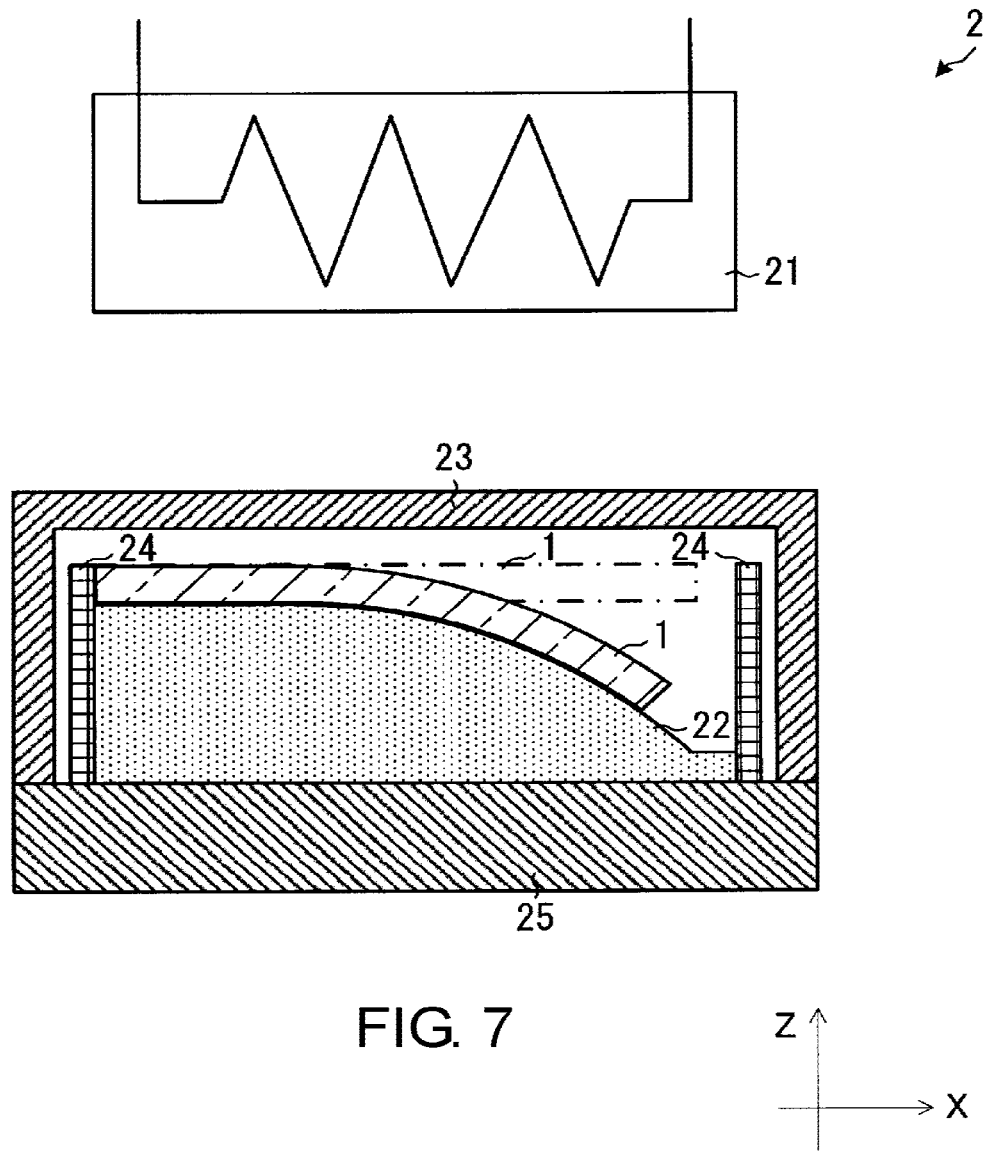
FIG. 7 is a schematic view showing a state of the molding step using a molding apparatus.

The glass member 1 which has been preheated (S2A1) is transported to a molding apparatus 2 as shown in FIG. 7. The molding apparatus 2 includes a heater 21, a mold 22, a cover 23, an outer mold 24, and a base 25. The glass member 1 is moved or conveyed onto the mold 22, and mounted on the mold 22 so that the mold 22 can be in contact with one of the main surfaces or an end face of the glass member 1. After that, the periphery of the mold 22 is covered with the cover 23 if necessary. Thus, preparation is made up. Incidentally, the glass member 1 may be mounted in the molding apparatus 2 before preheating. There is no special limitation.

The heater 21 is, for example, disposed above the cover 23 and at a predetermined distance therefrom. A radiation heater such as a sheathed heater may be used as the heater 21, but there is no special limitation. The heater 21 radiates radiation heat from the outside of the cover 23 to heat the cover 23. Thus, the glass member 1 disposed inside the cover 23 is heated indirectly by heat accumulated in the cover 23. The glass member 1 is heated to a temperature equal to or higher than the softening point or until the equilibrium viscosity reaches $10^{12.5}$ Pas or higher and $10^{17}$ Pa·s or lower.

The mold 22 has a molding surface for molding the second main surface 3b of the glass member 1 into a predetermined shape. That is, the molding surface of the mold 22 has a design surface for obtaining the glass article 10 having a desired design. An oxidation-resistant metal plate such as stainless steel, glass such as fused silica glass, ceramic, and carbon are preferable as the material of the mold 22. Glass such as fused silica glass and carbon are more preferable. Fused silica is high in resistance against high temperature and oxidizing atmosphere. In addition, fused silica hardly forms a defect in the glass member 1 in contact therewith. Thus, the glass article 10 can be obtained with a less-damaged surface. Carbon is so high in thermal conductivity that the glass article 10 can be produced efficiently. Incidentally, coating of metal, oxide, carbon or the like may be formed in the molding surface of the mold 22.

The cover 23 covering the mold 22 is effective to keep the surroundings of the mold 22 clean. For example, the cover 23 may be made of a metal plate of stainless steel or the like. Alternatively, a material such as glass or glass ceramic may be used, or a material of the same composition as the material of the mold 22 may be used.

The outer mold 24 may be disposed to surround the periphery of the mold 22, or may be used as abutment for positioning the glass member 1. The material of the outer mold 24 may be a material of the same composition as the mold 22 or the cover 23.

The mold 22 is mounted on a top surface of the base 25. Inside the base 25, a suction path for sucking the glass member 1 mounted on the mold 22 to the molding surface may be formed. A metal plate of stainless steel, glass, ceramic, etc. can be used as the material of the base 25. A material of the same composition as the mold 22 or the cover 23 may be used.

[Deformation; S2A3]

After the glass member 1 is mounted on the mold 22 or the like (S2A2), the glass member 1 disposed inside the cover 23 is heated by the heater 21, for example, to a temperature equal to or higher than the softening point of 700 to 750° C. so as to have the equilibrium viscosity of about $10^{6.5}$ to $10^{12.5}$ Pa·s. The glass member 1 heated thus is deformed by a deformation means which will be described later. Thus, a desired shape is provided to form a bent glass with a curvature part or the like. When the equilibrium viscosity of the glass member 1 is lower than $10^{6.5}$ Pa·s during deformation, the irregular layer 5 formed in the glass member 1 cannot keep its desired shape easily. Thus, the optical characteristic of a glass article obtained finally cannot be controlled easily. Incidentally, it is more preferable that the equilibrium viscosity is from $10^7$ to $10^{10}$ Pa·s in order to reduce the shape deviation of the glass article 10 from its desired design dimensions. In addition, temperature control is performed on the surface of the glass member 1 that is not in contact with the mold 22. Further, it is preferable that in the temperature-controlled glass member 1, the surface of the glass member 1 that is not in contact with the mold 22 has the irregular layer 5. When the temperature of the irregular layer 5 which has low glass transition point Tg is controlled, a desired antiglare layer 50 can be formed easily.

As the deformation means, a desired molding process may be selected from a gravity molding process, a differential pressure molding process (vacuum molding process), a press molding process, etc. in accordance with the shape of the glass article 10 to be obtained finally.

The gravity molding process is a process in which the glass member 1 is mounted on a predetermined mold 22 following the shape of the glass article 10, and the glass member 1 is then softened, and bent by gravity to follow the mold 22 to be thereby molded into a predetermined shape.

The differential pressure molding process is a process in which differential pressure is applied between the front and back surfaces of the glass member 1 which has been softened, and the glass member 1 is bent following the mold, and molded into a predetermined shape. In the vacuum molding process, which is a mode of the differential pressure molding process, the glass member 1 is placed on a predetermined mold 22 following the shape of the glass article 10, and an upper mold such as a cramp die is placed on the glass member 1 while the periphery of the glass member 1 is sealed. After that, a space between the mold 22 and the glass member 1 is decompressed by a pump to apply differential pressure between the front and back surfaces of the glass member 1. On this occasion, pressure may be applied to the upper surface side of the glass member 1 secondarily.

The press molding process is a process in which the glass member 1 is placed between predetermined molds (a mold 22 and an upper mold) following the shape of the glass article 10, and the glass member 1 is softened. In this state, a press load is applied between the upper and lower molds so that the glass member 1 can be bent following the molds to be thereby molded into a predetermined shape.

Of the aforementioned molding processes, the vacuum molding process and the gravity molding process are excellent as a process for molding the glass article 10 into a predetermined shape. The glass article 10 can be molded to bring, of the two main surfaces of the glass article 10, one main surface into no contact with the mold. It is therefore possible to reduce concave/convex defects such as damages, dents, etc. Further, in the latter process, treatment temperature during deformation can be made comparatively low. Thus, damages to block the function of the irregular layer 5 on the glass member 1 can be suppressed.

Incidentally, a local heating molding process or another differential pressure molding process than the vacuum molding process can be used. A suitable molding process may be selected in accordance with the shape of the glass article 10 after molding. Two or more kinds of molding processes may be used together.

It is preferable that radiation heating or convective heating is used as a heating method during deformation.

The radiation heating is a manner in which a body to be heated is heated by absorption of energy radiated from a heat source such as a heater. In this manner, a heating-cooling cycle for mass production of glass articles 10 can be shortened so that the tact time of deformation can be shortened. As a result, it is possible to improve the production efficiency of the glass articles 10.

The convective heating is a manner in which a body to be heated is heated by convection of gas in the atmosphere. In this manner, the temperature distribution within the surface of the glass member 1 can be made so uniform that the structure of the antiglare layer 50 on the glass article 10 obtained finally can be controlled easily. As a result, it is possible to improve the production efficiency of the glass article 10.

The bending depth of the glass article 10 obtained thus is preferably 1,000 mm or less, more preferably 500 mm or less, and further more preferably 300 mm or less. Thus, a glass article having the antiglare layer 50 with desired properties can be obtained as a final product without generating any crack in the irregular layer 5.

The average curvature radius of the curvature part of the glass article 10 obtained thus is preferably 5 mm or more and 5,000 mm or less, and more preferably 100 mm or more and 3,000 mm or less. Even when the molding step (S2A) in which an excessive load may be applied to the irregular layer 5 is performed, the glass article 10 superior in appearance without unevenness in the irregular layer 5 can be obtained.
[Cooling; S2A4]

After the glass member 1 is deformed (S2A3), the glass member 1 is cooled down to a temperature low enough to be handled, for example, room temperature in order to extract the glass article 10 with the antiglare layer 50 obtained from the irregular layer 5 whose surface shape has been changed.

In this manner, the molding step (S2A) is terminated, and extracting the glass article (S3) is carried out. Thus, the glass article 10 with a predetermined shape according to the embodiment is obtained. Micro-pores formed by etching or voids left behind after burning a solvent or an organic substance used when the irregular layer 5 is formed in the deposition treatment are densified in the molding step (S2A) so that the glass article 10 can show excellent excoriation resistance. Generally, it is considered that etching is performed after the glass substrate 3 is deformed, but the excoriation resistance cannot be shown for the aforementioned reason. Further, when etching is performed after the glass substrate 3 is deformed, the irregular layer 5 cannot be formed uniformly due to complexity of the base material. Thus, uniform optical properties cannot be obtained. The glass member 1 obtained according to the invention has not only the excoriation resistance but also excellent uniform optical properties.

Incidentally, the annealing step (S2B) which will be described later may be performed on the glass article 10. On this occasion, the glass article 10 is used as the glass member 1. In addition, on the occasion, the annealing step (S2B) which will be described later may be performed without cooling (S2A4) after deformation (S2A3).
(Annealing Step; S2B)

Figure 8:
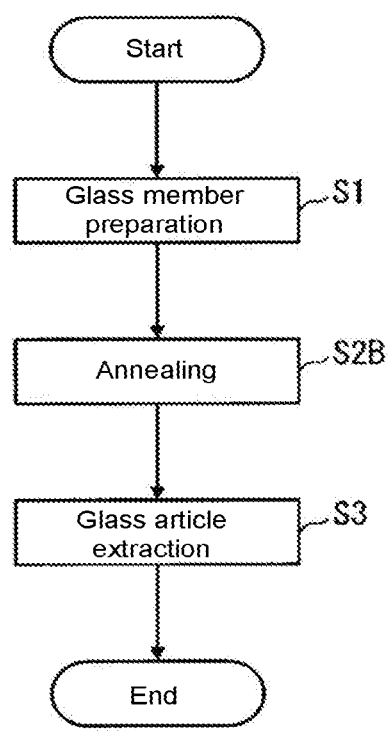
FIG. 8 is a flow chart of a schematic procedure showing an example of a production process for producing a glass article by an annealing step (S2B).
Figure 9:
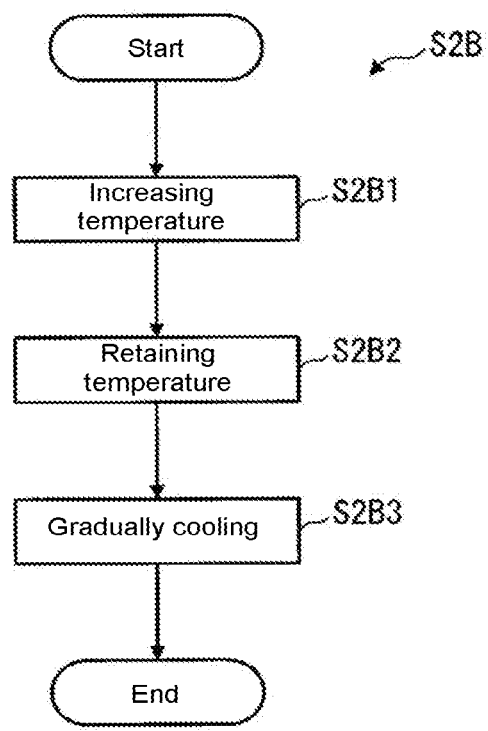
FIG. 9 is a flow chart of a schematic procedure showing an example of the annealing step (S2B).

FIG. 8 is a flow chart of a schematic procedure showing an example of the production process in which the heat treatment is performed in the annealing step (S2B). In the annealing step (S2B), as shown in FIG. 9, increasing temperature to desired temperature (S2B1), retaining the glass member at the desired temperature (S2B2), and gradually cooling the glass member (S2B3) whose temperature has been retained (S2B2) are performed. The glass member 1 supported by a suitable support member such as a support base, a mold, an arm, etc. in advance may be made movable among respective treatment stages of temperature increasing (S2B1), temperature retaining (S2B2) and gradual cooling (S2B3).

Incidentally, annealing has an effect capable of removing residual strain or residual stress inside the glass member 1. When a predetermined shape is given to the glass member 1 in the molding step (S2A), large residual stress may occur. In the glass member 1 with the residual stress, there arises a problem that strengthening treatment is performed unevenly. Particularly in a large and thin glass or a complicated-shape glass deformed into a shape suitable for an in-vehicle space, such as a front surface plate for use in an on-vehicle display panel, residual stress stays behind easily inside the glass. Due to the influence of the residual stress, strengthening treatment is so uneven that a variation in strength may occur while optical distortion may also occur easily due to the variation in strength. When the glass member 1 is annealed, residual strain can be avoided, and homogenous glass can be obtained.

It is preferable that radiation heating or convective heating is used as a heating method in the annealing step. When the radiation heating is used, a heating-cooling cycle for mass production of glass articles 10 can be shortened so that the tact time of the annealing step can be shortened. As a result, it is possible to improve the production efficiency of the glass articles 10. When the convective heating is used, the temperature distribution within the surface of the glass member 1 can be made uniform, and the stress within the surface of the glass article 10 obtained finally can be removed uniformly. As a result, it is possible to produce the glass articles 10 among which there is a less individual difference. Incidentally, both the radiation heating and the convective heating may be used together.
[Temperature Increasing; S2B1]

In the temperature increasing, the glass member 1 is heated so as to have the equilibrium viscosity of from $10^{12.5}$ to $10^{17}$ Pa·s. Desired annealing temperature in the annealing step is, for example, preferably about 550° C.

[Temperature Retaining; S2B2]

In the temperature retaining, the glass member 1 heated to the annealing temperature is, for example, kept for from 10 to 60 minutes. In this manner, the glass member 1 can be cooled down to the room temperature while suppressing creep deformation. In some case, the temperature retaining may be performed with the retained temperature set to be lower than the heating temperature in the temperature increasing. Incidentally, the "creep deformation" means a phenomenon that the glass member 1 which has been heated and retained, for example, until the equilibrium viscosity reaches from $10^{12.5}$ to $10^{17}$ Pa·s is deformed in shape as time goes.

[Gradual Cooling; S2B3]

In the gradual cooling, the glass member is, for example, cooled preferably at a cooling rate of from 0.3 to 10° C./min, and more preferably at a cooling rate of from 0.3 to 5° C./min. In this manner, it is possible to prevent a temperature distribution from occurring in the glass member, so that it is possible to prevent residual stress from occurring due to the temperature distribution. The gradual cooling is terminated at the point where the glass member reaches the room temperature, in which the equilibrium viscosity reaches $10^{17.8}$ Pa·s or higher.

In this manner, the annealing step (S2B) is terminated, and the glass article extraction (S3) is performed. Thus, the glass article 10 provided with a desired shape according to the embodiment can be obtained.

By the aforementioned heat treatment (S2), the irregular layer 5 changes slightly so that the antiglare layer 50 high in density can be obtained. Typically, the irregular layer 5 is low in density when the irregular layer 5 is formed in the glass member preparation (S1). This is because micro-pores formed by etching or residual voids left behind after burning a solvent or an organic substance used when the irregular layer 5 is formed in the deposition treatment are formed. When a glass with such a low-density irregular layer 5 is used, the irregular layer 5 is apt to be worn to deteriorate durability such as wear resistance. When the heat treatment (S2) in the embodiment is performed, the density of the irregular layer 5 is improved so that the antiglare layer 50 having durability such as wear resistance can be obtained.

<Glass Article 10>

Figure 10A:
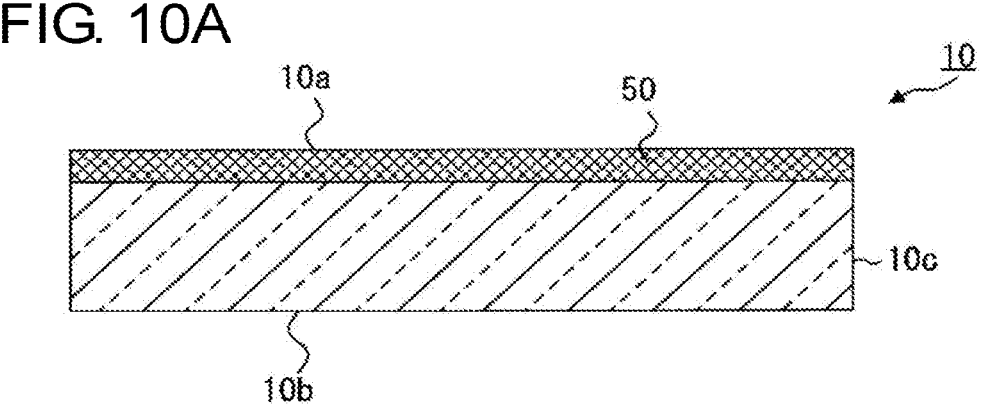
FIG. 10A and FIG. 10B are schematic sectional views of glass articles.
Figure 10B:
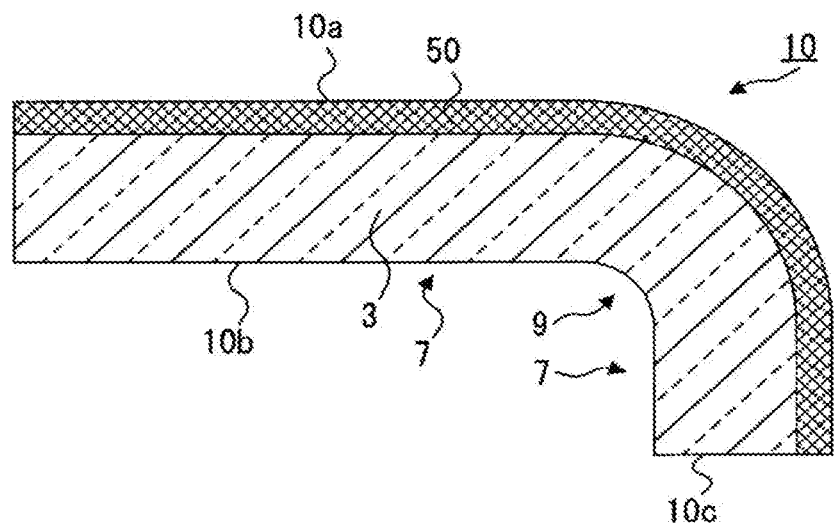

FIG. 10A and FIG. 10B show schematic sectional views of the glass article 10 according to the embodiment. The glass article 10 includes a first main surface 10a, a second main surface 10b, end faces 10c, and an antiglare layer 50 in at least one of the main surfaces. The glass article 10 may include an antiglare layer 50 in at least a part of the at least one of the main surfaces. The antiglare layer 50 will be described later. The glass article 10 may include a curvature part in at least one of the main surfaces.

[Antiglare Layer 50]

The antiglare layer 50 is obtained by performing the heat treatment (S2) on the glass member 1 in which the irregular layer 5 has been formed as described above.

The antiglare layer 50 has convex parts in its surface. The convex parts have an average diameter (in terms of a true circle) of 0.4 μm or more and 1.1 μm or less in a section at a height of +0.01 μm from bearing height in the image-processed surface. As a result, due to the convex parts high in strength, the antiglare layer 50 shows high wear resistance. The average diameter (in terms of a true circle) of the convex parts is more preferably 0.4 μm or more and 1 μm or less.

The antiglare layer 50 has a surface skewness Ssk of less than 0. When the Ssk is less than 0, the antiglare layer 50 has irregularities like a spoon-cut shape in the surface. In the range less than 0, the irregularities are gentler as the Ssk is larger (closer to 0). Accordingly, the wear resistance of the antiglare layer 50 is improved. It is preferable that the surface skewness Ssk is −1.2 or more and less than 0. In this manner, optical properties and excoriation resistance can be attained compatibly.

The surface arithmetical mean height (Sa) of the antiglare layer 50 is 0.06 μm or less. When the Sa is set within this range, the wear resistance of the antiglare layer 50 is improved. The surface arithmetical mean height (Sa) of the antiglare layer 50 is more preferably 0.01 μm or more and 0.06 μm or less, and further more preferably 0.02 μm or more and 0.06 μm or less. When the Sa is a larger value than the above, locally high convex parts increase to facilitate wear locally at the time of friction. Thus, the excoriation resistance deteriorates extremely. The Sa tends to increase as the gloss value is reduced. However, in the same gloss value, smaller Sa is advantageous in terms of excoriation resistance.

The glass transition point Tg of the antiglare layer 50 is equal to or lower than the glass transition point $Tg_0$ in a central part of the glass article 10 in thickness-direction sectional view. It is possible to obtain the glass article 10 in which cracking cannot occur in the antiglare layer 50 easily during the heat treatment (S2) and which has excellent optical properties and shows wear resistance. The difference between the glass transition points ($Tg_0-Tg$) is preferably 3° C. or more, more preferably 5° C. or more, and further more preferably 7° C. or more. The upper limit value of the difference is not limited especially. However, the difference is preferably 20° C. or less, and more preferably 15° C. or less.

It is preferable that the softening point Tm of the antiglare layer 50 is equal to or lower than the softening point $Tm_0$ in the central part of the glass article 10 in thickness-direction sectional view. It is possible to obtain the glass article 10 in which cracking cannot occur in the antiglare layer 50 easily during the heat treatment (S2) and which has excellent optical properties and shows wear resistance. The difference between the softening points ($Tm_0-Tm$) is preferably 3° C. or more, more preferably 10° C. or more, and further more preferably 20° C. or more. The upper limit value of the difference is not limited especially. However, the difference is preferably 100° C. or less, and more preferably 60° C. or less.

Incidentally, the glass transition point Tg is measured by JIS-R3103-3 (measuring method of transition temperature based on thermal expansion method), and the softening point Tm is measured by JIS-R3103-1 (testing method of glass softening point). For example, a vertical type thermal expansion meter (DL-9500 model, push bar type) made by Shinku-Riko Inc. can be used for measuring the glass transition point Tg.

Assume that an atomic composition ratio Z between Si and an element X selected from the group consisting of Al, B, Zr and Ti is defined as X/Si. It is preferable that a ratio $Z_1/Z_0$ of an atomic composition ratio $Z_1$ in the antiglare layer 50 to an atomic composition ratio $Z_0$ in the central part of the glass article 10 in thickness-direction sectional view is from 0.9 to 1.1. Thus, even when an antireflection layer, which will be described later, or the like is deposited, the layer hardly becomes a heterogeneous layer. The excellent glass article 10 can be obtained.

It is preferable that an alkali metal composition ratio {K/(Li+Na+K)} (an atomic composition ratio) is larger in the antiglare layer 50 than in the central part of the glass article 10 in thickness-direction sectional view. In this manner, the wear resistance of the antiglare layer 50 can be enhanced, and the refractive index can be reduced in the antiglare layer 50 in comparison with that in the central part of the glass article 10 in thickness-direction sectional view so that an antireflection effect can be obtained.

It is preferable that the antiglare layer 50 contains inorganic fluoride, inorganic chloride, etc., that is, a fluorine atom (F) or a chlorine atom (Cl). Thus, the Tg of the antiglare layer 50 can be reduced. In addition, hydrophilicity can be obtained. Thus, the antiglare layer 50 can be water-washed even if the outermost surface of the antiglare layer 50 gets dirty. Particularly inorganic fluoride is preferred because it has high hydrophilicity, and inorganic fluoride of multivalent cations such as Si, Al, Ca, Mg, etc. is especially preferred.

From above, it is possible to obtain the glass article 10 with the antiglare layer 50 having convex parts showing a desired antiglare property and having excellent wear resistance.

<Applications>

Applications of the glass articles 10 according to the invention are not limited especially. Specifically, the glass articles 10 may be applied to on-vehicle components (headlight covers, side mirrors, front transparent substrates, side transparent substrates, rear transparent substrates, instrument panel surfaces, on-vehicle display front surface plates, etc.), meters, building windows, show windows, architectural interior members, architectural exterior members, front surface plates (notebook type personal computers, monitors, LCDs, PDPs, LEDs, CRTs, PDAs, etc.), LCD color filters, touch panel substrates, pickup lenses, CCD cover substrates, solar cell transparent substrates (cover glasses, etc.), cellular phone windows, organic EL light emitting element components, fluorescence light emitting element components, optical filters, lighting lamps, lighting fixture covers, antireflection films, polarizing films, etc.

<Modifications>

The invention is not limited to the aforementioned embodiment, but various improvements, design changes, etc. can be made on the invention without departing from the gist of the invention. In addition, specific procedures, structures, etc. for carrying out the invention may be replaced by other structures, etc. as long as the object of the invention can be attained.

60° mirror surface glossiness in the outermost surface of the antiglare layer 50 of the glass article 10 is preferably 15% or more and 140% or less, and more preferably 40% or more and 130% or less. The 60° mirror surface glossiness in the outermost surface of the antiglare layer of the glass article is an index of an antiglare effect. The antiglare effect can be shown satisfactorily as long as the 60° mirror surface glossiness is 130% or less.

Line arithmetical mean roughness Ra in the outermost surface of the antiglare layer 50 of the glass article 10 is preferably 0.03 μm or more, more preferably 0.05 μm or more and 0.7 μm or less, and further more preferably 0.07 μm or more and 0.5 μm or less. The antiglare effect can be shown sufficiently as long as the arithmetical mean roughness Ra is 0.03 μm or more. Reduction in contrast of an image can be suppressed satisfactorily as long as the arithmetical mean roughness Ra is 0.7 μm or less.

Maximum height roughness Rz in the outermost surface of the antiglare layer 50 of the glass article 10 is preferably 0.2 μm or more and 5 μm or less, more preferably 0.3 μm or more and 4.5 μm or less, and further more preferably 0.5 μm or more and 4 μm or less. The antiglare effect can be shown sufficiently as long as the maximum height roughness Rz is 0.2 μm or more. Reduction in contrast of an image can be suppressed satisfactorily as long as the maximum height roughness Rz is 5 μm or less.

A haze value of the flat part of the glass article 10 is preferably 0.1% or more and 50% or less, more preferably 0.1% or more and 30% or less, and further more preferably 0.1% or more and 20% or less. The antiglare effect can be shown satisfactorily as long as the haze value is 0.1% or more. Reduction in contrast of an image can be suppressed satisfactorily as long as the haze value is 50% or less when the glass article 10 is provided as a front surface plate or one of various filters on the visual recognition side of an image display apparatus body.

A haze value of the curvature part of the glass article 10 is preferably 0.1% or more and 50% or less, more preferably 0.1% or more and 30% or less, and further more preferably 0.1% or more and 20% or less. The antiglare effect can be shown satisfactorily as long as the haze value is 0.1% or more. Reduction in contrast of an image can be suppressed satisfactorily as long as the haze value is 50% or less when the glass article 10 is provided as a front surface plate or one of various filters on the visual recognition side of an image display apparatus body.

When the glass article 10 includes a flat part and a curvature part as shown in FIG. 10B, a ratio between reflected image diffusive index values R (reflected image diffusive index value R of curvature part/sum of reflected image diffusive index values R of flat part and curvature part) is preferably from 0.3 to 0.8, more preferably from 0.4 to 0.7, and further more preferably from 0.4 to 0.6. When the haze value is high, whitening is enhanced due to light scattering to thereby enhance shading. Thus, evenness in visual appearance is affected by the enhanced shading. When the ratio between the reflected image diffusive index values R is within the aforementioned range, evenness in visual appearance is hardly affected by shading. Thus, excellent appearance can be obtained.

The standard deviation of the haze value within the surface in the glass article 10 is preferably from 0 to 10%, and more preferably from 0 to 6%. Within this range, the antiglare layer can be visually recognized as homogenous when a user visually recognize the glass article. Thus, excellent appearance can be enhanced. In addition, there is no fear that touch feeling is spoilt by the irregularities of the antiglare layer. In addition, when the glass article 10 is used as a front surface plate of an on-vehicle display panel, homogeneity can be obtained in an image visually recognized from a driver's seat. Thus, comfortable operation can be secured.

The standard deviation of the sparkle index value S within the surface in the glass article 10 is preferably from 0 to 10%, and more preferably from 0 to 6%. Within this range, a display screen of a liquid crystal display or the like can be visually recognized without uncomfortable feeling. In addition, when the glass article 10 is used as a front surface plate of an on-vehicle display panel, homogeneity can be obtained in an image visually recognized from a driver's seat. Thus, comfortable operation can be secured.

The standard deviation of the resolution index value T within the surface in the glass article 10 is preferably from 0 to 10%, and more preferably from 0 to 6%. Within this range, a display screen of a liquid crystal display or the like can be visually recognized without uncomfortable feeling.

In addition, when the glass article 10 is used as a front surface plate of an on-vehicle display panel, homogeneity can be obtained in an image visually recognized from a driver's seat. Thus, comfortable operation can be secured.

The following steps or treatments may be performed on the glass member 1 or the glass article 10 (hereinafter referred to as material to be processed).

(Grinding or Polishing)

At least one of the main surfaces of the material to be processed may be subjected to grinding or polishing treatment.

(Hole Making)

A hole may be formed in least a part of the material to be processed. The hole may penetrate the material to be processed or not penetrate the material to be processed. Hole making may be performed by mechanical processing with a drill, a cutter or the like, or by etching using hydrofluoric acid, though not limited.

(Edge Processing)

Processing such as chamfering may be performed on end faces of the material to be processed. When the material to be processed is of glass, it is preferable that so-called R-chamfering or C-chamfering is performed by mechanical grinding. However, etching may be used and there is no special limitation. The edge processing may be performed in advance on the glass member and thereafter the glass member may be formed into the glass article through heat treatment.

(Strengthening)

A physical strengthening method or a chemical strengthening method may be used as a strengthening method for forming a surface compressive stress layer in the material to be processed. The material to be processed whose glass main surface has been strengthened is higher in mechanical strength. In this configuration, any one of the strengthening methods may be used. In order to obtain a glass having a small thickness and a large surface compressive stress (CS) value, it is preferable that the glass is strengthened by the chemical strengthening method.

It is preferable that the strengthening step is performed after the glass article extraction (S3).

[Chemical Strengthening Method]

The chemical strengthening method is a treatment in which in molten salt just under 450° C., alkali metal ions (typically Li ions or Na ions) existing in the main surface of glass as the material to be processed and each having a small ion radius are exchanged with alkali ions (typically Na ions for the Li ions, or K ions for the Na ions) each having a larger ion radius, so that a compressive stress layer can be formed in the surface of the glass. The chemical strengthening can be performed by a method known in the background art. Typically, the glass is immersed into molten potassium nitrate salt. About 10 mass % of potassium carbonate may be added to the molten salt and used. In this manner, cracking can be removed from the surface layer of the glass, so that high-strength glass can be obtained. When a silver component such as silver nitrate is mixed into the potassium nitrate during the chemical strengthening, the glass can have silver ions in its surface due to ion exchange so that an antibacterial property can be provided. The chemical strengthening is not limited to once, but may be performed, for example, two or more times on different conditions.

A surface compressive stress layer is formed on at least one of the main surfaces of the material to be processed. A surface compressive stress (CS) value of the compressive stress layer is preferably 500 MPa or higher, more preferably 550 MPa or higher, further more preferably 600 MPa or higher, and especially further more preferably 700 MPa or higher. As the surface compressive stress (CS) is higher, the mechanical strength of the strengthened glass is higher. On the other hand, when the surface compressive stress (CS) is too high, there is a fear that the tensile stress inside the glass may be extremely high. Therefore, the surface compressive stress (CS) is preferably 1,800 MPa or lower, more preferably 1,500 MPa or lower, and further more preferably 1,200 MPa or lower.

The depth (DOL) of the surface compressive stress layer formed in the main surface of the glass is preferably 5 μm or more, more preferably 8 μm or more, and further more preferably 10 μm or more. On the other hand, when the DOL is too large, there is a fear that the tensile stress inside the glass may be increased extremely. Thus, the depth (DOL) of the compressive stress layer is preferably 70 μm or less, more preferably 50 μm or less, further more preferably 40 atm or less, and typically 30 μm or less.

The surface compressive stress (CS) value of the surface compressive stress layer formed in the main surface of the material to be processed and the depth (DOL) of the surface compressive stress layer can be obtained from the number of interference fringes and intervals thereof observed with a surface stress meter (FSM-6000, made by ORIHARA Industrial Co., Ltd.). For example, a light source with a wavelength of 589 nm or 790 nm can be used as a measuring light source for FSM-6000. Incidentally, the surface compressive stress may be measured using birefringence. When optical evaluation is difficult, estimation can be made using mechanical strength evaluation of three-point bending or the like. On the other hand, the tensile stress (CT: by MPa) formed inside the material to be processed can be calculated by the following expression using the aforementioned measured surface compressive stress (CS: by WO and the aforementioned measured depth (DOL: by μm) of the surface compressive stress layer.

$$CT=\{CS\times(DOL\times10^{-3})\}/\{t-2\times(DOL\times10^{-3})\}$$

Incidentally, t (by mm) designates the sheet thickness of the glass.

Incidentally, the material to be processed may be cleansed after the strengthening treatment. As the cleansing, for example, acid treatment, alkaline treatment, or alkaline brush washing may be performed in addition to water washing.

(Functional Layer Treatment)

Various functional layers may be formed on the material to be processed if necessary. Examples of the functional layers may include an antireflection treatment layer, an antifouling treatment layer, etc., and those layers may be used together. The layers may be formed on either the first main surface or the second main surface of the material to be processed. The layers are preferably formed on the obtained glass article 10, and more preferably formed after the strengthening treatment step.

[Antireflection Treatment Layer]

The antireflection treatment layer is a layer that produces an effect of reducing the reflectance, brings reduction in the glare caused by reflection of light, and in the case of using it for a display device, can increase the transmittance of light from the display device and improve the visibility of the display device.

In the case where the antireflection treatment layer is an antireflection film, the film is preferably formed on the first main surface or the second main surface of the material to be processed with no limitation. The configuration of the antireflection film is not limited as long as the reflection of light can be inhibited, and the film may have, for example, a configuration including a laminate of a high-refractive-index layer having a refractive index of 1.9 or more at a wavelength of 550 nm and a low-refractive-index layer having a refractive index of 1.6 or less at the same wavelength, or a configuration including a layer having a refractive index of from 1.2 to 1.4 at a wavelength of 550 nm and including a film matrix in which hollow particles or pores have been mixed.

[Antifouling Treatment Layer]

The antifouling treatment layer is a layer for inhibiting attachment of an organic substance and an inorganic substance to the surface, or even when an organic substance or an inorganic substance is attached to the surface, for facilitating removal of the attached substance by cleaning such as wiping-off.

In the case where the antifouling treatment layer is formed as an antifouling film, the film is preferably formed on the first main surface and the second main surface of the material to be processed or on another surface treatment layer. The antifouling treatment is not limited as long as an antifouling property can be imparted. In particular, the film is preferably composed of a fluorine-containing organic silicon compound coat obtained by a hydrolysis and condensation reaction of a fluorine-containing organic silicon compound.

(Formation of Printed Layer)

A printed layer may be formed by various kinds of printing methods and inks (printing material) depending on applications thereof. As the printing methods, examples thereof may include spray printing, ink jet printing, and screen printing. By these methods, good printing can be conducted even on a material to be processed which has a large area. In particular, by use of the spray printing, printing is easily performed on a material to be processed which has a curvature part, and the surface roughness of a printed surface is easily controlled. On the other hand, by use of the screen printing, a desired print pattern is easily formed so as to have uniform average thickness in a wide material to be processed. In addition, a plurality of inks may be used. From the standpoint of adhesiveness of a printed layer, it is preferable that one kind of ink is used. The ink forming the printed layer may be organic or inorganic.

Examples

Examples of the present invention will be described. Examples 1 to 4 are examples of the present invention, and Examples 5 and 6 are comparative examples. The invention is not limited to the following examples.

[Preparation of Plate]

A sheet glass (DRAGONTRAIL (registered trademark), manufactured by Asahi Glass Co., Ltd.) having rectangular main surfaces each measuring 300 mm×300 mm and a thickness of 0.7 mm was used as a glass substrate. In the following description, one of the main surfaces of the glass substrate will be referred to as a first main surface, and the other main surface will be referred to as a second surface.

(1) Formation of an irregular layer, and (2) Grinding end faces were performed on the glass substrate to produce a glass member.

[Glass Member]

(1) Formation of Irregular Layer

An irregular layer was formed on the first main surface of the glass substrate by a frost treatment in the following procedure.

First, an acid-resistant protective film (hereinafter referred to as "protective film" simply) was pasted on the main surface (second main surface) of the glass substrate where an irregular layer would not be formed. The glass substrate was immersed in a 3 mass % hydrogen fluoride solution, and the glass substrate was etched so that dirt attached to the first main surface could be eliminated. Successively, the glass substrate was immersed in a mixed solution of 15 mass % of hydrogen fluoride and 15 mass % of potassium fluoride, and frost treatment was performed on the first main surface. After that, the glass substrate was immersed in a 10 mass % hydrogen fluoride solution to form an irregular layer so that fluoride could stay behind on the first main surface. Thus, a glass member with the irregular layer was formed. Incidentally, the glass transition point Tg was 593° C. in the central part of the glass member in thickness-direction sectional view, and from 583 to 586° C. in the irregular layer. The glass member was adjusted to set the haze value at about 7.1% and the 60° mirror surface glossiness (gloss value) at 107% in Examples 1 to 6.

(2) Grinding Treatment of End Faces

The glass member was cut into a piece measuring 100 mm×100 mm. After that, C-chamfering was performed with a depth of 0.2 mm from an end face of the glass all over the periphery of the glass substrate. The chamfering was performed using a #600 grinding stone (made by Tokyo Dia Co.), which was operated at a rotational speed of 6,500 rpm and at a moving speed of 5,000 mm/min. Thus, the surface roughness of the end face was 450 nm.

The obtained glass member was (3) mounted on a mold, (4) preheated, deformed and cooled to produce a glass article.

[Glass Article]

(3) Mounting

A mold 22 as shown in FIG. 7 was used, in which a design surface was formed with a curvature radius of 500 mm in a Z-axis direction of a single curved structure. Carbon was used as the material of the mold 22. As shown in FIG. 7, each glass member of Examples 1 to 4 shown in Table 1 was mounted on the mold 22 with the second surface down.

(4) Preheating/Deforming/Cooling

After the mounting, preheating, deforming and cooling were performed on the glass member and the mold as a whole. In the preheating, temperature was increased from room temperature to desired temperature. In the deforming, the desired temperature was retained. In the cooling, the temperature was decreased to annealing point, and then cooled down to the room temperature by radiation. Temperature conditions and temporal conditions in the respective examples are shown in Table 1. The deforming was performed at 680° C. and with an equilibrium viscosity of about $10^9$ Pa·s. After that, the glass member and the mold were cooled down to the room temperature. The glass members of Examples 1 to 4 were treated on the conditions shown in Table 1, and glass articles each having an antiglare layer were produced. The temperature conditions were controlled in the first main surface. Examples 5 and 6 are non-heated glasses which have not been preheated, deformed and cooled.

TABLE 1

| | before deforming | | deforming conditions | | |
|---|---|---|---|---|---|
| | haze value % | gloss value % | heating method | temperature °C. | time sec. |
| Example 1 | 7.1 | 107 | radiation heating | 680 | 3600 |
| Example 2 | 7.1 | 107 | radiation heating | 680 | 3600 |
| Example 3 | 7.1 | 107 | radiation heating | 680 | 600 |
| Example 4 | 7.1 | 107 | radiation heating | 680 | 600 |
| Example 5 | 7.1 | 107 | deforming step not performed | | |
| Example 6 | 7.1 | 107 | deforming step not performed | | |

[Wear Resistance Test with Sandpaper]

Sandpaper was attached to a plane metal friction piece with a bottom surface measuring 10 mm×10 mm to form a friction element for rubbing against each sample. Next, wear resistance test was performed using the friction piece with a triple-type plane abrasion tester (made by Daiei Kagaku Seiki Mfg. Co., Ltd.). Specifically, the aforementioned friction piece was attached to the abrasion tester so that the bottom surface of the friction piece could contact the irregular layer or the antiglare layer of the sample. A weight was placed so that a load on the friction piece can reach 1,000 g. The friction piece reciprocated and slid at an average speed of 3,200 mm/min and with one way 40 mm long. The test was performed with the number of frictions counted as two times per two ways. A haze value and a gloss value were measured on each tested sample in which friction had been performed 100 times. Glass articles were used as the samples in Examples 1 to 4, and non-heated glasses were used as the samples in Examples 5 and 6.

Table 2 shows, for each glass article of Examples 1 to 4, a haze value and a gloss value after deforming, a gloss value and a haze value before and after the wear resistance test on the glass article, a change amount and a change rate between the gloss values and between the haze values before and after the wear resistance test on the glass article, and a result of observation of a surface shape before the wear resistance test, and for each non-heated glass of Examples 5 and 6, a gloss value and a haze value before and after the wear resistance test, and a result of observation of a surface shape before the wear resistance test.

An average diameter of convex parts, Sa and Ssk were obtained as analysis items of the surface shape of each sample. The results are shown in Table 2. In addition, the average diameter of the convex parts and a gloss change rate before and after the wear resistance test are shown in FIG. 11.

In each Example 1 to 4, the change of the gloss value after heating was within +12% as the change amount relative to the gloss value of the glass article before heating, and within +11% as the change rate relative to the same.

Figure 11:
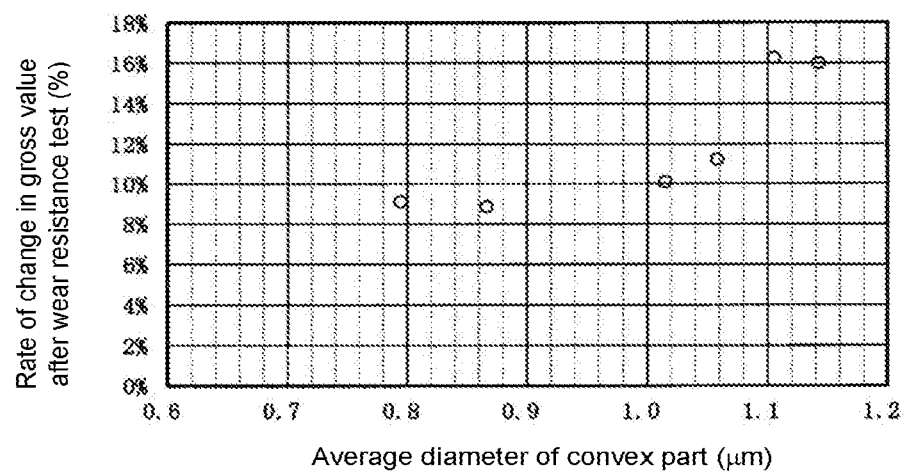
FIG. 11 is a graph showing a relationship between an average diameter of convex parts and a rate of change in gross value after a wear resistance test among each glass article and each glass member.

As shown in FIG. 11, it is understood that the change rate of the gloss value of the glass article before and after the wear resistance test decreases with reduction in average diameter of the convex parts, and wear resistance is improved suddenly when the change rate of the gloss value is 1.1 μm or less.

The convex part average diameter is an averaged diameter expressed in terms of a circle of a convex part section cut at a height of +0.01 μm from bearing height in an "image processed surface". It is considered that reduction in convex part average diameter means that steepness in a fine convex part in the surface was reduced, and the irregular shape in the surface of the glass article was deformed by heat treatment to reduce the steepness of the irregular shape due to heat to thereby improve the wear resistance.

As has been described, according to the invention, a glass article excellent in visual recognition such as antiglare property, and high in wear resistance was obtained.

While the present invention has been described in detail and with reference to specific embodiments thereof, it will be apparent to one skilled in the art that various changes and modifications can be made therein without departing from the spirit and scope thereof.

DESCRIPTION OF REFERENCE NUMERALS AND SIGNS

1 glass member
10 glass article
2 molding apparatus
3 glass substrate
5 irregular layer
50 antiglare layer
7 flat part
9 curvature part

The invention claimed is:

1. A glass article comprising:
   a first main surface;
   a second main surface;
   an end face; and
   an antiglare layer provided on at least one surface selected from the group consisting of the first main surface and the second main surface, wherein the antiglare layer is formed by a process of forming surface irregularities on the at least one surface of the glass article, the process

TABLE 2

| | after deforming | | diameter of convex part μm | Sa μm | Ssk | surface shape before and after wear resistance test | | change amount after wear resistance test N = 100 | | change rate after wear resistance test N = 100 | |
|---|---|---|---|---|---|---|---|---|---|---|---|
| | haze value % | gloss value % | | | | Δ(haze value) % | Δ(gloss value) % | haze value % | gloss value % | | |
| Example 1 | 5.6 | 114 | 0.79 | 0.051 | −0.65 | 4.9 | 10.4 | −12% | 9% | | |
| Example 2 | 5.7 | 114 | 0.87 | 0.052 | −0.07 | 5.0 | 10.1 | −13% | 9% | | |
| Example 3 | 7.2 | 107 | 1.02 | 0.059 | −1.07 | 6.1 | 10.8 | −16% | 10% | | |
| Example 4 | 7.3 | 106 | 1.06 | 0.055 | −0.96 | 5.7 | 11.9 | −22% | 11% | | |
| Example 5 | — | — | 1.11 | 0.063 | −0.55 | 4.1 | 17.4 | −42% | 16% | | |
| Example 6 | — | — | 1.14 | 0.066 | −1.20 | 4.2 | 17.1 | −40% | 16% | | | comprising heating the glass article to a temperature equal to or higher than a softening point thereof to deform the glass article;
wherein
a difference between a glass transition point Tg of the antiglare layer and a glass transition point $Tg_0$ in a central part of the glass article in a thickness-direction sectional view, $(Tg_0-Tg)$, is from 3° C. to 20° C.; and
the at least one surface comprises a curvature part.

2. The glass article according to claim 1,
wherein
a glass transition point Tg of the antiglare layer is equal to or lower than a glass transition point $Tg_0$ in a central part of the glass article in a thickness-direction sectional view;
the antiglare layer has arithmetic mean roughness Sa within a surface of 0.06 μm or less and surface skewness Ssk of less than 0 in a surface shape obtained by measuring a region of (101 μm×135 μm) to (111 μm×148 μm) in the antiglare layer with a laser microscope; and
the glass article comprises a convex part having an average diameter, in terms of a true circle, at a height of +0.01 μm from a bearing height in an image processed surface of from 0.4 μm to 1.1 μm with reference to the bearing height when an image obtained from XYZ data of the surface shape measured with the laser microscope is filtered by image processing software to obtain a smoothed image, and XYZ data of the smoothed image are subtracted from XYZ data of the surface shape to obtain the image processed surface.

3. The glass article according to claim 2, wherein the at least one surface comprises a curvature part.

4. The glass article according to claim 1, wherein
a ratio $Z_1/Z_0$ of an atomic composition ratio $Z_1$ in the antiglare layer to an atomic composition ratio $Z_0$ in the central part of the glass article in the thickness-direction sectional view is from 0.9 to 1.1 when an atomic composition ratio Z between Si and an element X selected from the group consisting of Al, B, Zr and Ti is defined as X/Si.

5. The glass article according to claim 1, wherein
an alkali metal composition ratio expressed by {K/(Li+ Na+K)} is larger in the antiglare layer than in the central part of the glass article in the thickness-direction sectional view.

6. The glass article according to claim 1, wherein the antiglare layer comprises a fluorine atom (F) or a chlorine atom (Cl).

7. The glass article of claim 2, wherein the convex part has the average diameter of from 0.79 μm to 1.06 μm.

8. A method for producing the glass article of claim 1 from a glass member comprising a glass substrate comprising a first main surface, a second main surface, an end face, and an irregular layer formed on at least one of the first and second main surfaces, the method comprising:

forming the irregular layer having a glass transition point Tg which is equal to or lower than a glass transition point in a central part of the glass member in a thickness-direction sectional view; and performing a heat treatment on the glass member so as to have an equilibrium viscosity in the central part of the glass member in the thickness-direction sectional view of $10^{17}$ Pa·s or lower.

9. The method for producing a glass article according to claim 8, wherein the irregular layer is formed by etching treatment.

10. The method for producing a glass article according to claim 8, wherein the irregular layer is formed by blasting treatment.

11. The method for producing a glass article according to claim 8, wherein the heat treatment is performed during molding.

12. The method for producing a glass article according to claim 11, wherein in the molding, the glass member is mounted on a mold so that one of the main surfaces or the end surface of the glass member is in contact with the mold, and then the glass member is deformed.

13. The method for producing a glass article according to claim 12, wherein in the molding, temperature control is performed on a surface of the glass member that is not in contact with the mold.

14. The method for producing a glass article according to claim 13, wherein the surface of the glass member that is not in contact with the mold comprises the irregular layer.

15. The method for producing a glass article according to claim 8, wherein the heat treatment is performed during annealing.

16. The method for producing a glass article according to claim 8, wherein the heat treatment is performed by radiation heating.

17. The method for producing a glass article according to claim 8, wherein the heat treatment is performed by convection heating.

* * * * *